(12) United States Patent
Brizard

(10) Patent No.: US 9,170,346 B2
(45) Date of Patent: Oct. 27, 2015

(54) METHOD AND SYSTEM FOR MARINE SEISMIC SURVEY

(71) Applicant: CGGVERITAS SERVICES SA, Massy (FR)

(72) Inventor: Thierry Brizard, Massy (FR)

(73) Assignee: CGGVERITAS SERVICES SA, Massy (FR)

( * ) Notice: Subject to any disclaimer, the term of this patent is extended or adjusted under 35 U.S.C. 154(b) by 404 days.

(21) Appl. No.: 13/713,310

(22) Filed: Dec. 13, 2012

(65) Prior Publication Data
US 2013/0155806 A1   Jun. 20, 2013

Related U.S. Application Data

(60) Provisional application No. 61/577,937, filed on Dec. 20, 2011.

(51) Int. Cl.
*G01V 1/38* (2006.01)
*B63B 22/18* (2006.01)
*B63B 22/00* (2006.01)

(52) U.S. Cl.
CPC ............. *G01V 1/3817* (2013.01); *B63B 22/18* (2013.01); *B63B 2022/006* (2013.01); *G01V 1/3835* (2013.01)

(58) Field of Classification Search
CPC . G01V 1/3817; G01V 1/3835; G01V 1/3843; G01V 1/186; B63B 22/18; B63B 2022/006
USPC ...................................................... 367/15–24
See application file for complete search history.

(56) References Cited

U.S. PATENT DOCUMENTS

| | | | |
|---|---|---|---|
| 3,972,019 A * | 7/1976 | Bassett | 367/77 |
| 4,616,320 A * | 10/1986 | Kerr et al. | 702/14 |
| 5,379,267 A | 1/1995 | Sparks et al. | |
| 6,625,083 B2 | 9/2003 | Vandenbroucke | |
| 6,932,185 B2 | 8/2005 | Bary et al. | |
| 2006/0256652 A1 * | 11/2006 | Thomas | 367/15 |
| 2010/0302901 A1 | 12/2010 | Welker et al. | |
| 2011/0266086 A1 * | 11/2011 | Welker et al. | 181/122 |

FOREIGN PATENT DOCUMENTS

EP    1 217 390 A1    6/2002

OTHER PUBLICATIONS

Brian G. Ferguson, et al., "Sensing the Underwater Acoustic Environment with a Single Hydrophone Onboard an Undersea Glider", Oceans 2010 IEEE—Sydney, May 24-27, 2010, pp. 1-5, XP031777041, IEEE, Piscataway, NJ, USA.

(Continued)

*Primary Examiner* — Ian J Lobo
(74) *Attorney, Agent, or Firm* — Patent Portfolio Builders PLLC

(57) ABSTRACT

A buoy is configured to record seismic signals while underwater. The buoy includes a body; a buoyancy system configured to control a buoyancy of the body to descend multiple times to a predetermined depth (H) and then resurface with a controlled speed; and a seismic sensor located in the body and configured to record the seismic signals. The seismic sensor is instructed to record the seismic signals as the buoy travels up and down between the water surface and the predetermined depth.

20 Claims, 8 Drawing Sheets

(56) References Cited

OTHER PUBLICATIONS

David M, Fratantoni, et al., "Development and Validation of a Mobile, Autonomous, Broadband Passive Acoustic Monitoring System for Marine Mammals", Woods Hole Oceanographic Institution, Report, Sep. 30, 2009, pp. 1-6, XP002715507, Woods Hole, MA, USA.
Teledyne Webb Research: "APEX Profiling Float: The World's Most Versatile Drifting Profilers", Teledyne Webb Research APEX product line, May 12, 2013, pp. 1-4, XP055085582, Internet: URL:http://www.webbresearch.com/pdf/Apex_Float_Brochure.pdf.
International Search Report mailed Nov. 12, 2013, in related International Application No. PCT/EP2012/076512.
Written Opinion mailed Nov. 12, 2013, in related International Application No. PCT/EP2012/076512.
Office Action dated Apr. 23, 2014 in corresponding U.S. Appl. No. 13/736,331.
Office Action dated Apr. 23, 2014 in corresponding U.S. Appl. No. 13/736,342.

* cited by examiner

METHOD AND SYSTEM FOR MARINE SEISMIC SURVEY

CROSS-REFERENCE TO RELATED APPLICATIONS

This application claims the benefit of U.S. Provisional Application No. 61/577,937, filed Dec. 20, 2011 and entitled "Method and System for Marine Seismic Survey," the entire content of which is incorporated herein by reference.

BACKGROUND

1. Technical Field

Embodiments of the subject matter disclosed herein generally relate to methods and systems and, more particularly, to mechanisms and techniques for performing a marine seismic survey using buoys that carry appropriate seismic sensors.

2. Discussion of the Background

Marine seismic data acquisition and processing generate a profile (image) of geophysical structures under the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration for determining properties of earth's subsurface, which is especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon deposits.

A traditional system for generating the seismic waves and recording their reflections off the geological structures present in the subsurface is illustrated in FIG. 1. A vessel 10 tows an array of seismic receivers 11 provided on streamers 12. The streamers may be disposed horizontally, i.e., lying at a constant depth relative to the surface 14 of the ocean. The streamers may be disposed to have other than horizontal spatial arrangements. The vessel 10 also tows a seismic source array 16 configured to generate a seismic wave 18. The seismic wave 18 propagates downward toward the seafloor 20 and penetrates the seafloor until eventually a reflecting structure 22 (reflector) reflects the seismic wave. The reflected seismic wave 24 propagates upward until it is detected by the receiver 11 on the streamer 12. Based on the data collected by the receiver 11, an image of the subsurface is generated by further analyses of the collected data.

However, this traditional configuration is expensive because the costs associated with operating the towing vessel and the streamers are high. In addition, the data produced by the receivers of the streamers is poor due to the flow noise produced by the movement of the streamers in water. Further, the notch diversity of the data recorded with the streamers might be limited. To overcome some of these problems, new technologies deploy seismic sensors on the bottom of the ocean (ocean bottom stations, OBS) to improve the coupling and reduce the noise. Even so, positioning the seismic sensors remains a challenge for OBS technology.

Other technologies use permanent receivers set on the sea bottom, as disclosed in U.S. Pat. No. 6,932,185 (herein '185), the entire content of which is incorporated herein by reference. In this case, the seismic sensors 60 are attached, as shown in FIG. 2 (which corresponds to FIG. 4 of the '185), to a heavy pedestal 62. A station 64 that includes the sensors 60 is launched from a vessel and arrives, due to its gravity, at a desired position. The station 64 remains on the bottom of the ocean permanently. Data recorded by sensors 60 is transferred through a cable 66 to a mobile station 68. When necessary, the mobile station 68may be brought to the surface to retrieve the data.

Although this method provides a better coupling between the ocean bottom and the seismic receivers, the process is still expensive and not flexible because the stations and corresponding sensors are difficult to move around or reuse. Further, positioning the stations is not straightforward. Furthermore, the notch diversity is not greatly improved.

An improvement to this method is described, for example, in European Patent No. EP 1 217 390 (herein '390), the entire content of which is incorporated herein by reference. In this document, a receiver 70 is removably attached to a pedestal 72 together with a memory device 74 as illustrated in FIG. 3. After recording the seismic signals, the receiver 70 and the memory device 74 are instructed by a vessel 76 to detach from the pedestal 72 and to surface at the ocean surface 78 to be picked up by the vessel 76.

However, this configuration is not very reliable because the mechanism maintaining the receiver 70 connected to the pedestal 72 may fail to release the receiver 70. Also, the receiver 70 and pedestal 72 may not reach their intended positions on the seabed. Further, the fact that the pedestals 72 are left behind increases ocean pollution and the survey price, which is undesirable.

Thus, it can be seen from above that a characteristic of existing methods is the record of seismic signals either (i) close to the surface, with streamers, or (ii) at the seabed with OBS. Neither situation offers the desired notch diversity.

Accordingly, it would be desirable to provide systems and methods that provide an inexpensive and reliable device for recording seismic signals with good notch diversity.

SUMMARY

According to an exemplary embodiment, there is a buoy for recording seismic signals while underwater. The buoy includes a body, a buoyancy system configured to control a buoyancy of the body to descend multiple times to at least one predetermined depth (H) and then resurface with a controlled speed, and a seismic sensor located on the body and configured to record the seismic signals. The seismic sensor is instructed to record the seismic signals as the buoy travels up and down between the water surface and the predetermined depth.

According to another exemplary embodiment, there is a system for conducting a marine seismic survey. The survey includes plural buoys configured to record seismic signals when launched in water, a launching vessel configured to hold and launch the plural buoys along a given path, and a recovery vessel configured to recover the plural buoys after the buoys have recorded the seismic signals at plural depths and times. The at least one buoy includes a body, a buoyancy system configured to control a buoyancy of the body to descend multiple times to a predetermined depth (H) and then resurface with a controlled speed, and a seismic sensor located in the body and configured to record the seismic signals. The seismic sensor is instructed to record the seismic signals as the buoy travels up and down between the water surface and the predetermined depth.

According to still another exemplary embodiment, there is a method for recording seismic signals with buoys. The method includes a step of instructing at least one buoy to move up and down between a predetermined depth and the water surface; a step of recording the seismic signals with the at least one buoy at various depths between the predetermined depth and the water surface during a single trip; a step of time-stamping the seismic signals; a step of recording relative displacements, based on an input from an inertial system, of the at least one buoy between consecutive recordings; and a step of calculating absolute positions of the at least one buoy based on the relative displacements.

According to yet another exemplary embodiment, there is a computer readable medium including computer executable instructions, wherein the instructions, when executed by a processor, implement a method for recording seismic signals with buoys as noted above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
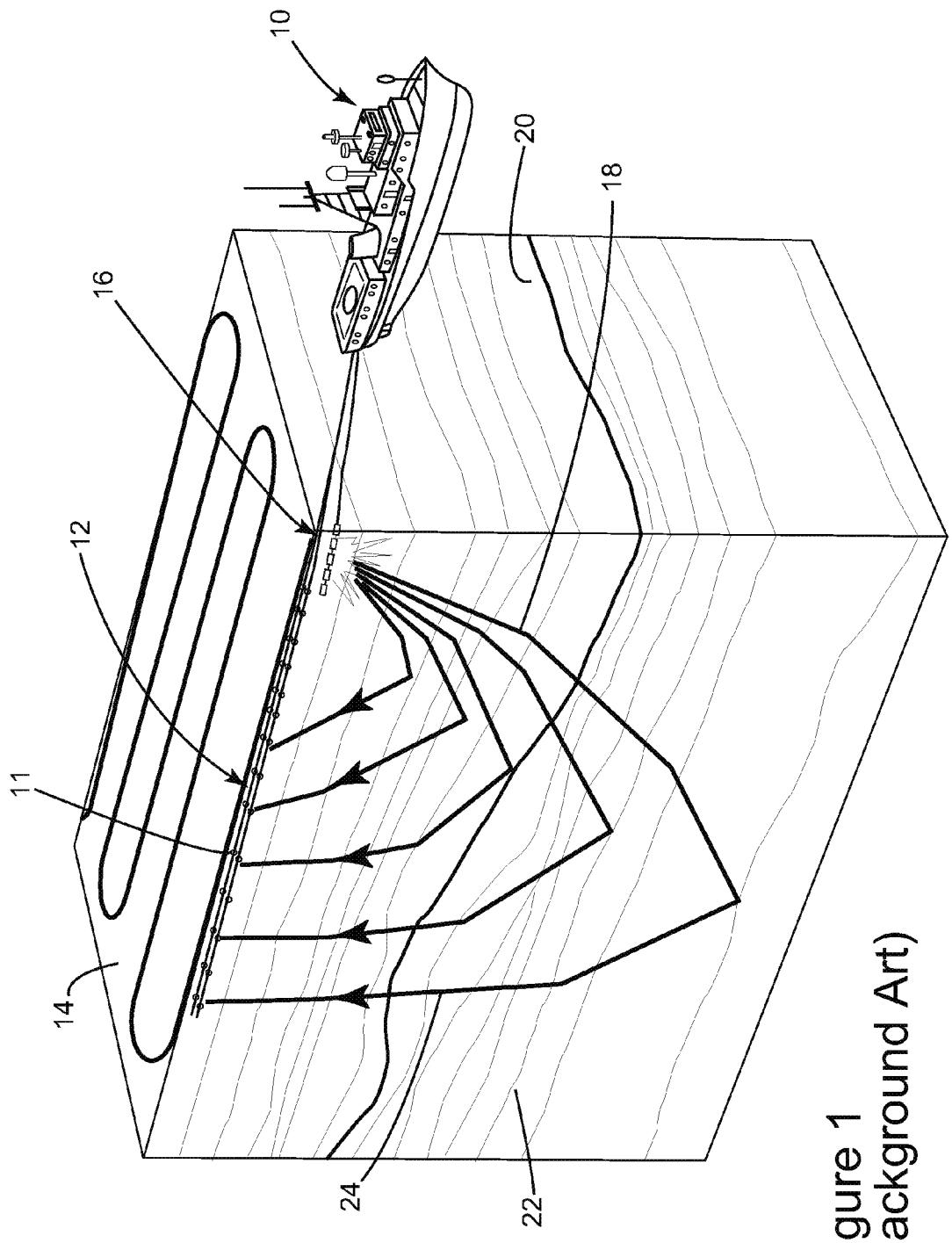
FIG. 1 is a schematic diagram of a conventional seismic survey system.
Figure 2:
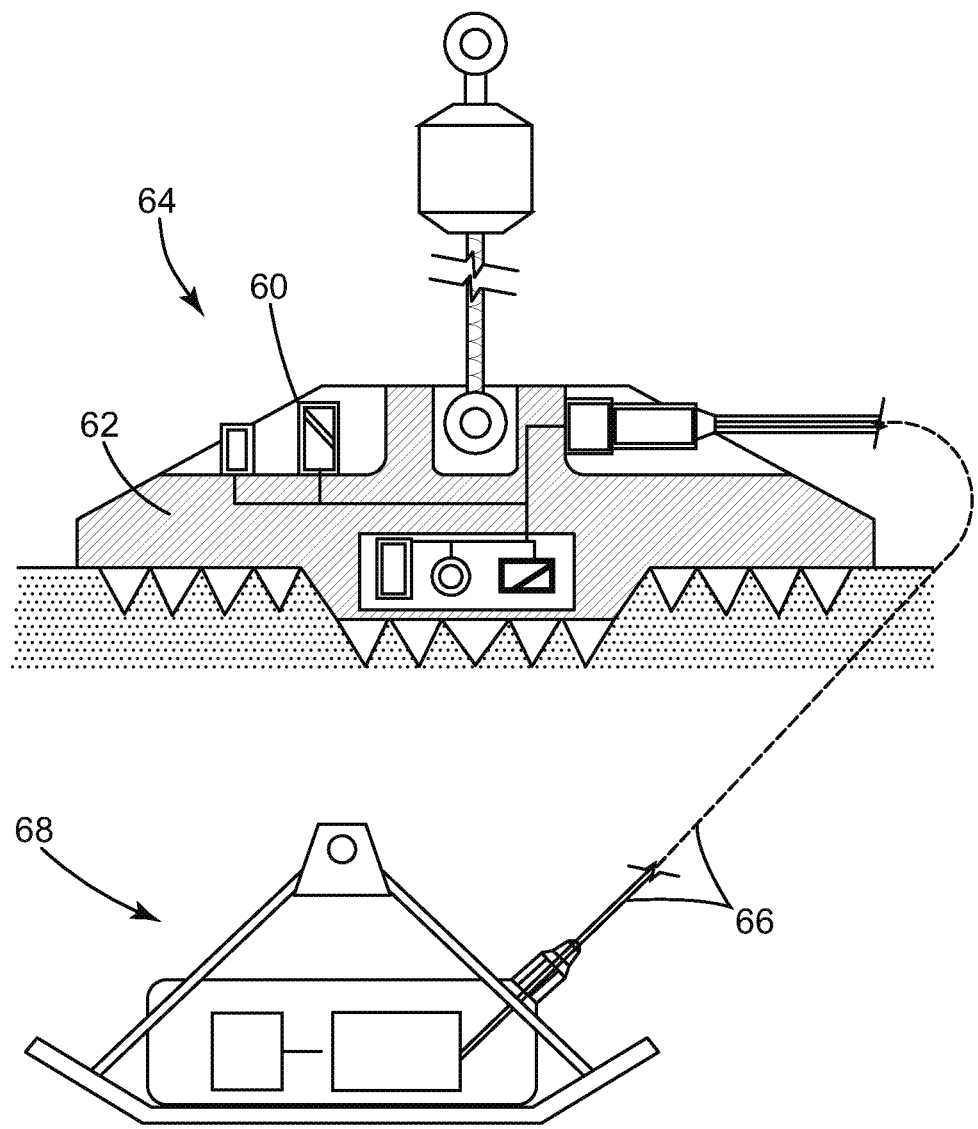
FIG. 2 is a schematic diagram of a station that may be positioned on the bottom of the ocean for seismic data recording.
Figure 3:
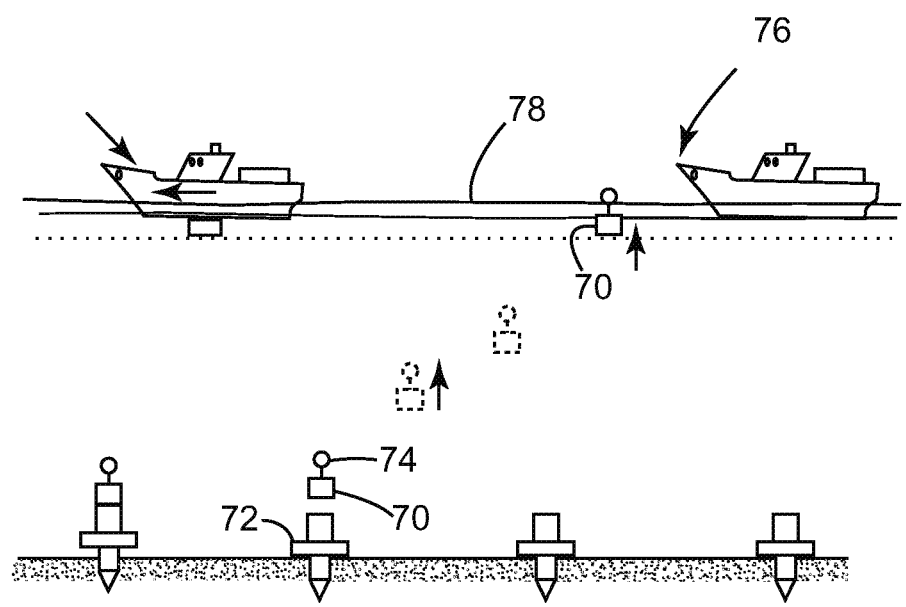
FIG. 3 is a schematic diagram of another station that may be positioned on the bottom of the ocean for seismic data recording.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a buoy having seismic sensors and being deployed from a deployment vessel. However, the embodiments to be discussed next are not limited to buoys being deployed from a vessel, but may be applied to other devices that may include seismic sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

New technologies in marine seismic surveys need an inexpensive system for deploying to and recovering from the sea seismic receivers. According to an exemplary embodiment, such a seismic system includes multiple buoys each having one or more seismic sensors. The buoys are initially stored on a launching vessel. The launching vessel launches the buoys at predetermined distances along a course of the vessel. The seismic receivers may be one of a hydrophone, geophone, accelerometers, electromagnetic sensors, etc. The buoys are configured to control their own buoyancy so that each buoy is capable of reaching a predetermined depth and then resurfacing on its own. The seismic receivers are configured to record seismic signals as the buoy travels to its final depth and back. The seismic signals are time-stamped and associated with corresponding three-dimensional (3D) positions (coordinates of the buoy) where the signals were recorded. After the buoy resurfaces, an accurate position of the buoy is acquired from an external system, e.g., a global positioning system (GPS). Based on this information, the buoy corrects, if necessary, the previously recorded 3D positions for each seismic signal. Then, this corrected data is stored and the buoy may sink back to the predetermined depth to again collect seismic data. These operations may be repeated several times before a recovery vessel recovers the buoy to retrieve the seismic data.

A seismic system having the above-noted features is now discussed in more detail. According to an exemplary embodiment illustrated in FIG. 4, a buoy 100 may have a body 101 that includes a buoyancy system 102 configured to control the buoyancy of the buoy. For example, the buoyancy system 102 may change the effective density of the buoy. The density of any object is determined by its mass divided by its volume. The buoy 100 may keep its mass constant, but altering its volume changes its density. To achieve this, for example, a hydraulic piston may be used to push, e.g., mineral oil out of the buoy and expand a rubber bladder at the bottom end of the buoy. As the bladder expands, the buoy becomes less dense than seawater and rises to the surface. Upon finishing its tasks at the surface, the buoy withdraws the piston and descends again to the desired depth to record seismic signals. This is one example for controlling the buoyancy of the buoy. Those skilled in the art would appreciate that other systems may be employed for controlling the buoyancy of the buoy. In one application, the buoyancy system may include a motor and a propeller to further control the speed and direction of the buoy.

Further, the buoy 100 may include one or more sensors 104, e.g., a pressure gauge, for determining pressure and/or temperature of the ambient of the buoy, etc. A processor 106 may be connected to the sensors 104 and the buoyancy system 102 for coordinating the up and down movement of the buoy. The processor 106 may also be configured to control the vertical speed of the buoy, by controlling the buoyancy of the buoy. For example, the processor may be configured to achieve a first speed for a shallow depth and a second speed for higher depths. Also, the processor 106 may calculate the depth of the buoy based on the pressure readings from the sensor 104.

The processor 106 may also be connected to a battery 108, a high accuracy oscillator or clock module 110, e.g., a temperature-controlled crystal oscillator (TCXO), a data storage device 112, an inertial device 114, a GPS 116 and a corresponding antenna 116a, and a radio frequency (RF) beacon 118 and a corresponding antenna 118a, etc. The battery 108 may be any known battery. The TCXO module 110 is configured to provide an accurate time to the processor 106 for correctly time-stamping the recorded seismic data. In one application, the TCXO module 110 is configured to sample every 2 ms the acoustic signal and time-stamp it. Based on the temperature sensor, the TCXO may adjust/correct its oscillating time to provide an accurate time as the water temperature is changing.

The inertial device 114 may be an inexpensive inertial navigation system (INS). An inertial navigation system includes at least a module containing accelerometers, gyroscopes or other motion-sensing devices. The INS is initially provided with the position and velocity of the buoy from another source, for example, a human operator, the GPS 116, etc., and thereafter the INS computes its own updated position and velocity by integrating information received from its motion sensors. The advantage of an INS is that it requires no external references in order to determine its position, orientation or velocity once it has been initialized. Further, usage of the INS is inexpensive.

The inertial device 114 is connected to the GPS system 116 for receiving the surface position of the buoy any time when the buoy surfaces. The GPS system 116 may be a high-resolution system, e.g., a differential GPS (DGPS). The processor 106 and/or the inertial device 114 are configured to activate the GPS system 116 only when the buoy is floating at the surface of the water or it is very close to the surface of the water, e.g., less than 1 m. In this way, the buoy acquires its precise location before descending to the predetermined depth, and also when resurfacing from the predetermined depth. Thus, its initial and final positions are accurately determined using the GPS system 116.

The buoy 100 may also include an RF beacon 118 configured to send RF signals such that a vessel can locate the buoy. The processor 106 is configured to activate the RF beacon 118 when the buoy is at the surface of the water or the antenna 118a is capable of transmitting the RF signals to a vessel. Those skilled in the art would recognize that the buoy may include other equipment that helps the navigation. However, it is desirable to provide an inexpensive buoy and, for this reason, the equipment added to the buoy should be kept to a minimum.

In terms of seismic equipment, the buoy 100 may include one or more seismic sensors 120. Such a sensor may be at least one of a hydrophone, geophone, accelerometer, electromagnetic sensor, etc. In one application, the seismic sensor includes only a hydrophone. In another application, the seismic sensor includes a hydrophone and three geophones. Additionally, the buoy 100 may include an acoustic signal conditioning module 122. This module is configured to process the acquired seismic signals, for example, to apply various filters to the recorded seismic signals.

Figure 4:
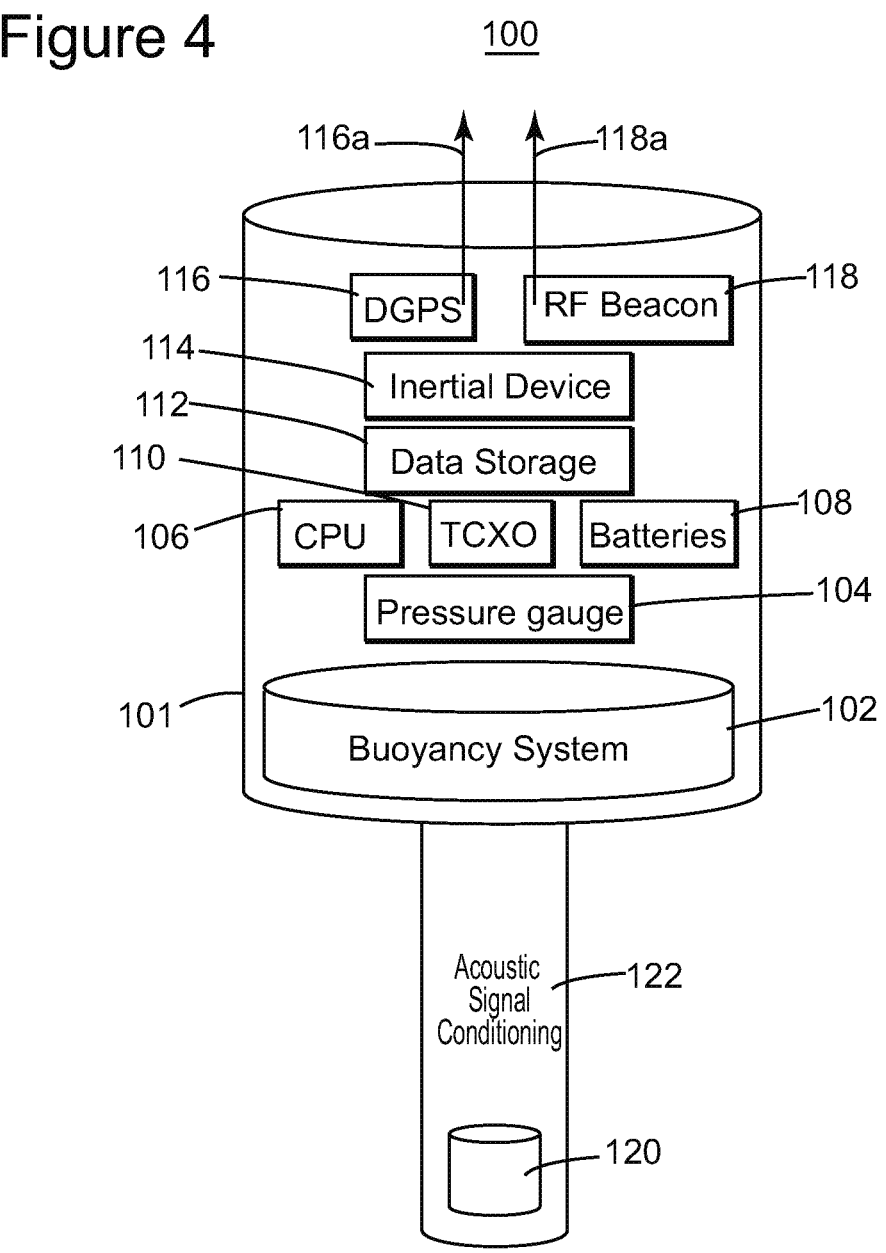
FIG. 4 is a schematic diagram of a buoy configured to record seismic signals while traveling underwater according to an exemplary embodiment.
Figure 5:
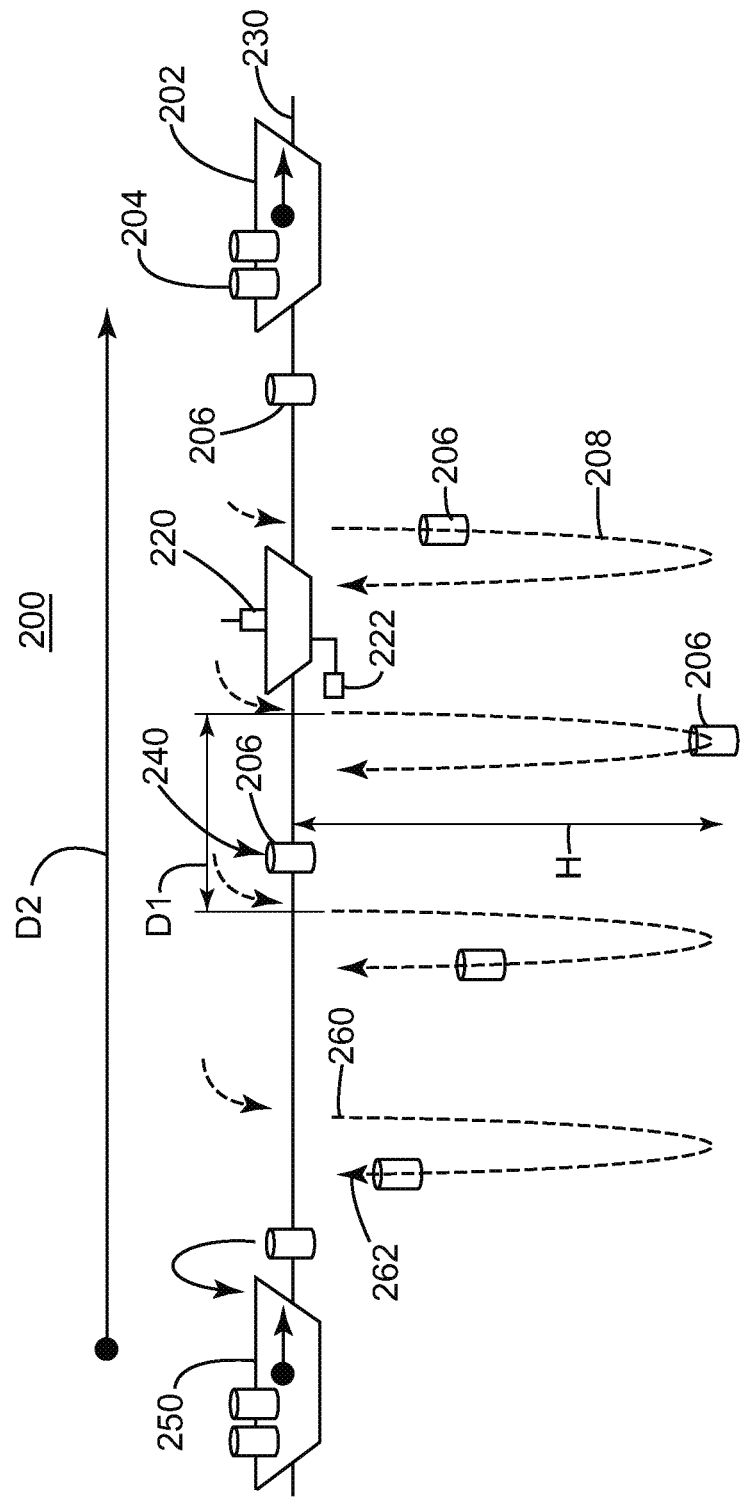
FIG. 5 is a schematic diagram of a system for collecting seismic signals according to an exemplary embodiment.

In one exemplary embodiment, the buoy illustrated in FIG. 4 is intended to be used in conjunction with a launching vessel, a recovery vessel and a source vessel as discussed next. Of course, more or fewer vessels may be used depending on the size and goals of the survey. FIG. 5 illustrates a survey with only three vessels.

FIG. 5 shows an overall view of an operation that includes launching plural buoys, recording seismic data multiple times and then recovering the buoys. The seismic system 200 includes a launching vessel 202 configured to hold many (e.g., 2,000) buoys 204. The launching vessel 202 is configured to follow a predetermined path and to launch the buoys 204 into the water. The launching vessel 202 may launch the buoys one by one along the path. In one application, the launching vessel may launch the buoys in pairs.

A launched buoy 206 is shown in FIG. 5. The launched buoy 206 acquires at this time its GPS position and provides this data to the inertial device 114. The sensors 104 are initialized and ready to sense specific parameters, e.g., seismic waves. The inertial device 114 and/or the processor 106 instruct the buoyancy system 102 to sink the buoy to a predetermined depth H (e.g., about 300 m) with a predetermined rate (e.g., about 50 cm per second). Computer software instructions may be stored in the buoy for achieving these conditions. These instructions may also include how often the seismic data should be recorded, how to acquire and store associated 3D positions of the buoy, etc.

As the buoy 206 travels along a path 208 to the predetermined depth H, the seismic sensor 120 is instructed to record seismic data at a given time interval $\Delta t$. For example, the time interval may be 2, 4, 6 or 8 ms. Other time intervals may be used. For each recording instant, a position of the buoy is also determined and recorded. The inertial device 114 is capable of providing the 3D position of the buoy at any time because the inertial device has the initial absolute position of the buoy and can calculate relative displacements of the buoy. Thus, a table including seismic recordings, corresponding times and undersea 3D positions of the buoy associated with the seismic recordings is generated while the buoy 206 travels along path 208.

When the buoy 206 reaches the predetermined depth H, the processor 106 instructs the buoyancy system 102 to take the buoy to the surface at a predetermined speed. In one application, the buoy may spend a predetermined time at the maximum depth H before returning to the surface. However, in either situation, the buoy is configured to continuously record the seismic signals. In this way, the seismic survey produces data having good diversity, which is important for removing the ghost effects which plague traditional surveys.

The seismic signals are produced by a source vessel 220 that travels, for example, in parallel with the launching vessel 202. Those skilled in the art would appreciate that the source vessel may travel along other paths. The source vessel 220 is configured to tow underwater at least one source 222. The source is configured to emit acoustic signals. After the buoy 206 has reached the water surface 230, the buoy may activate its RF beacon 118 to signal its position to one of the vessels, e.g., the recovery vessel. At the same time, the buoy 206 activates its GPS system 116 for determining its exact location. Based on this final position and the initial position, the processor 106 may adjust the positions associated with the recorded seismic data (e.g., the 3D positions) to correct them. This process is discussed later in more detail.

The buoy 206 may perform this correction process while floating at the surface of the water. However, the buoy 206 may also perform this process or continue to perform it while the buoy 206 starts another trip from position 240 to the predetermined depth H. In other words, in this exemplary embodiment, the buoy 206 acts as a yo-yo device, going up and down between the surface of the water and the predetermined depth H a couple of times before being recovered by the recovery vessel 250. To recover the buoy, the recovery vessel 250 may have an RF goniometer to detect and localize buoys at the surface. Even if the buoys are not to be recovered, one of the vessels detects and stores the positions of the surface buoys for obtaining a map of their locations. After being recovered, the buoys are stored on the recovery vessel 250 where they can undergo various processes, e.g., maintenance, data transfer, testing, etc. The maintenance process may include, but is not limited to, changing or replacing the battery, removing the data storage device 112 and replacing it with a new one, or transferring the data from the data storage device via a wireless interface, e.g., wi-fi interface.

Returning to the launching vessel 202, it is noted that the buoys can be launched so that the distance between them is D1, e.g., about 10 m. The distance between the launching vessel 202 and the recovery vessel 250 may be D2, e.g., about 10 km. Of course, other distances may be used depending on the size of the preplot, the available vessels and buoys, etc.

FIG. 5 indicates that the buoy 206 starts one segment of the yo-yo motion at an initial position 260 and ends up at a different, final position 262. This difference in the initial and final positions is due, mainly, to the water currents. This deviation of the buoy may be used to boost the accuracy of the seismic survey. For example, by recording the 3D positions of the buoy over the path 208, a map of the present water currents may be determined. For example, if the predetermined depth H is around 300 m and the buoy is configured to record its 3D positions every 2 ms, then the buoy may need between a minute and two to resurface. For this time interval, the buoy may collect around 100,000 data points. Considering that a seismic survey of this type may include, for example, around 1,000 to 2,000 buoys, a detailed current map of the water may be achieved.

Figure 6:
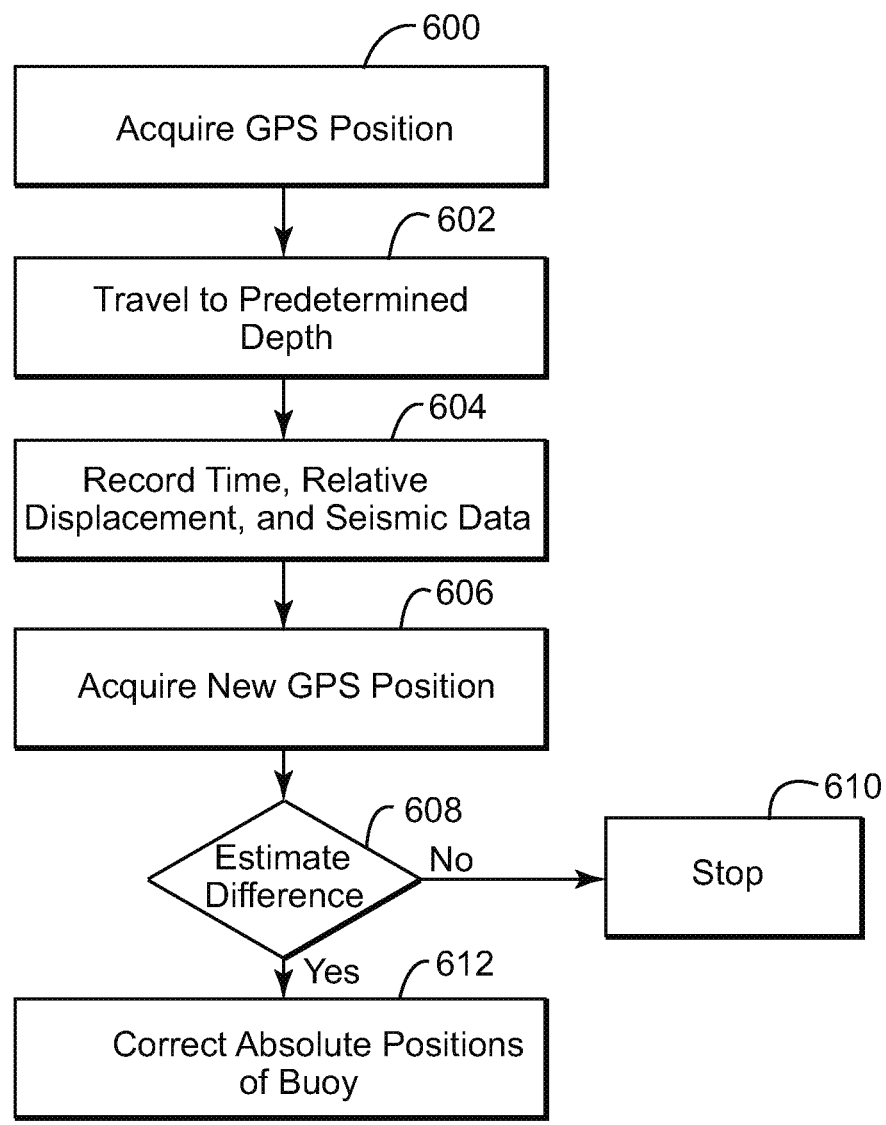
FIG. 6 is a flowchart of a method for collecting seismic signals according to an exemplary embodiment.

Next, the process of correcting the positions of the buoy associated with the seismic data is discussed with regard to FIG. 6. FIG. 6 is a flowchart that illustrates the steps for correcting the data. It is noted that there are situations when the data is not corrected. For example, if a deviation of the final position 262 and the initial position 260 of the buoy is smaller than a given threshold, the processor 106 may be instructed to not correct the data.

FIG. 6 shows a step 600 in which the initial position ($X_A$, $Y_A$, $Z_A$) of the buoy is determined by the GPS system 116 and provided to the processor 106. This position may be provided to the inertial device 114. The buoy is instructed in step 602 to sink to a predetermined depth, H. The instruction to sink may be provided by the processor 106 or from a vessel, e.g., the launching vessel via the RF beacon. The buoy may be instructed to start in step 604 recording a time, 3D position and seismic data when arriving at a predetermined depth $Z_0$. For example, $Z_0$ may be around 3 m. At this depth, the time $t_0$, inertial relative displacements ($x_0$, $y_0$, $z_0$) relative to the initial absolute position ($X_A$, $Y_A$, $Z_A$), and seismic data are determined and recorded. The time $t_0$ is provided by the TCXO module 110, the inertial relative displacements (i.e., the distance between a previous position and a current position) are determined by the inertial device 114, and the seismic data is recorded by the receiver 120. After a predetermined time $\Delta t$ (e.g., 2 ms), a new depth $Z_1$ is reached and thus, a new time $t_1$ is determined, a new relative displacement ($x_1$, $y_1$, $z_1$) is obtained and new seismic data is recorded. The process continues as the buoy travels to the predetermined height H. Thus, the buoy acquires and records all this data at every $\Delta t$ time interval. The process continues when the buoy changes its buoyancy in order to resurface. When the buoy resurfaces, this process is stopped. Hence, according to this exemplary embodiment, the buoy records the time, position and seismic data every $\Delta t$ second, from the initial position 260 in FIG. 5 until reaching the final position 262.

Next, after surfacing, the buoy acquires a new GPS position ($X_B$, $Y_B$, $Z_B$), which corresponds to the final position 262. However, when the buoy resurfaces, as the inertial device 114 is not an accurate device, it is expected that the last recorded position by the buoy, e.g., XA+x52321, YA+y52321, ZA+z52321 (assuming that there are 52321 recordings between the initial position 260 and the final position 262), is different from the new acquired position ($X_B$, $Y_B$, $Z_B$) of the buoy. This difference is estimated in step 608. If the difference is smaller than a predetermined threshold, then the process stops at 610. Otherwise, the process advances to step 612 in which the absolute 3D recording positions of the buoy are corrected.

The absolute positions of the buoy are calculated based on the initial position of the buoy ($X_A$, $Y_A$, $Z_A$) to which the relative displacements ($x_i$, $y_i$, $z_i$) are added. Assuming that corrections need to be made, the difference between the initial ($X_A$, $Y_A$, $Z_A$) and the final ($X_B$, $Y_B$, $Z_B$) positions of the buoy are, in one application, linearly divided to each intermediary absolute position ($X_i$, $Y_i$, $Z_i$). After performing these corrections, the times, the absolute positions and the seismic data are stored in the data storage device 112. This data is later processed to generate an image of the surveyed subsurface.

It is noted that the process of calculating the corrections noted in the above paragraph may be completed by the buoy between two consecutive yo-yo motions, or may be completed while the buoy descends to the predetermined depth, or may be completed on the vessel after recovering the buoy.

Figure 7:
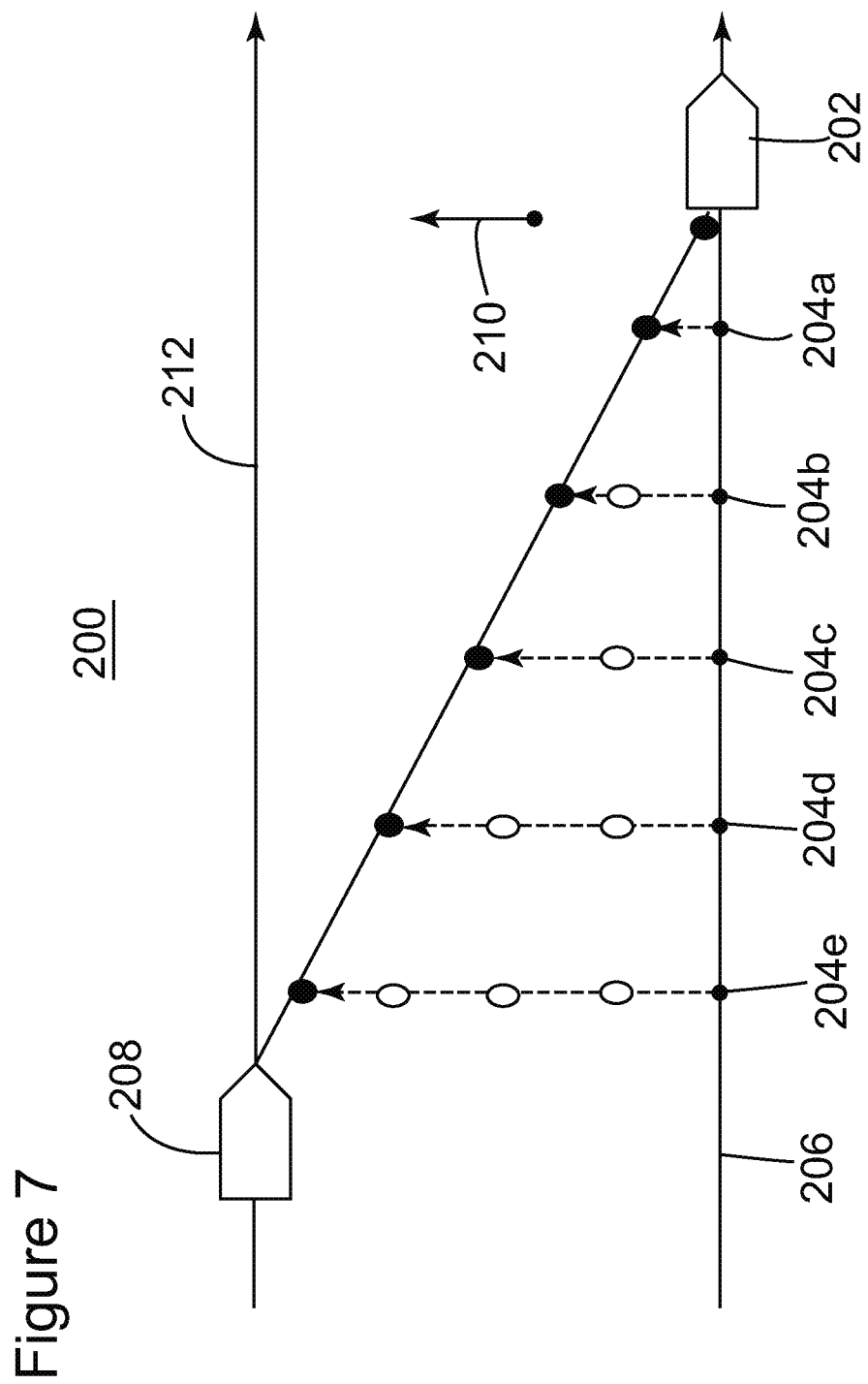
FIG. 7 is a schematic diagram of a system for launching and recovering buoys according to an exemplary embodiment.

FIG. 7 shows a top view of a system 200 in which the launching vessel 202 launches buoys 204a-e along a predetermined path 206. A map of the buoys may be achieved as discussed above, i.e., each time a buoy surfaces, its RF beacon sends a signal and the recovery vessel 208 determines the positions of the surfaces buoys. Comparing their initial and final positions after each descent, the recovery vessel 208 may calculate how strong the currents 210 are and may take a path 212 that intercepts the buoys after performing a predetermined number of descents.

Figure 8:
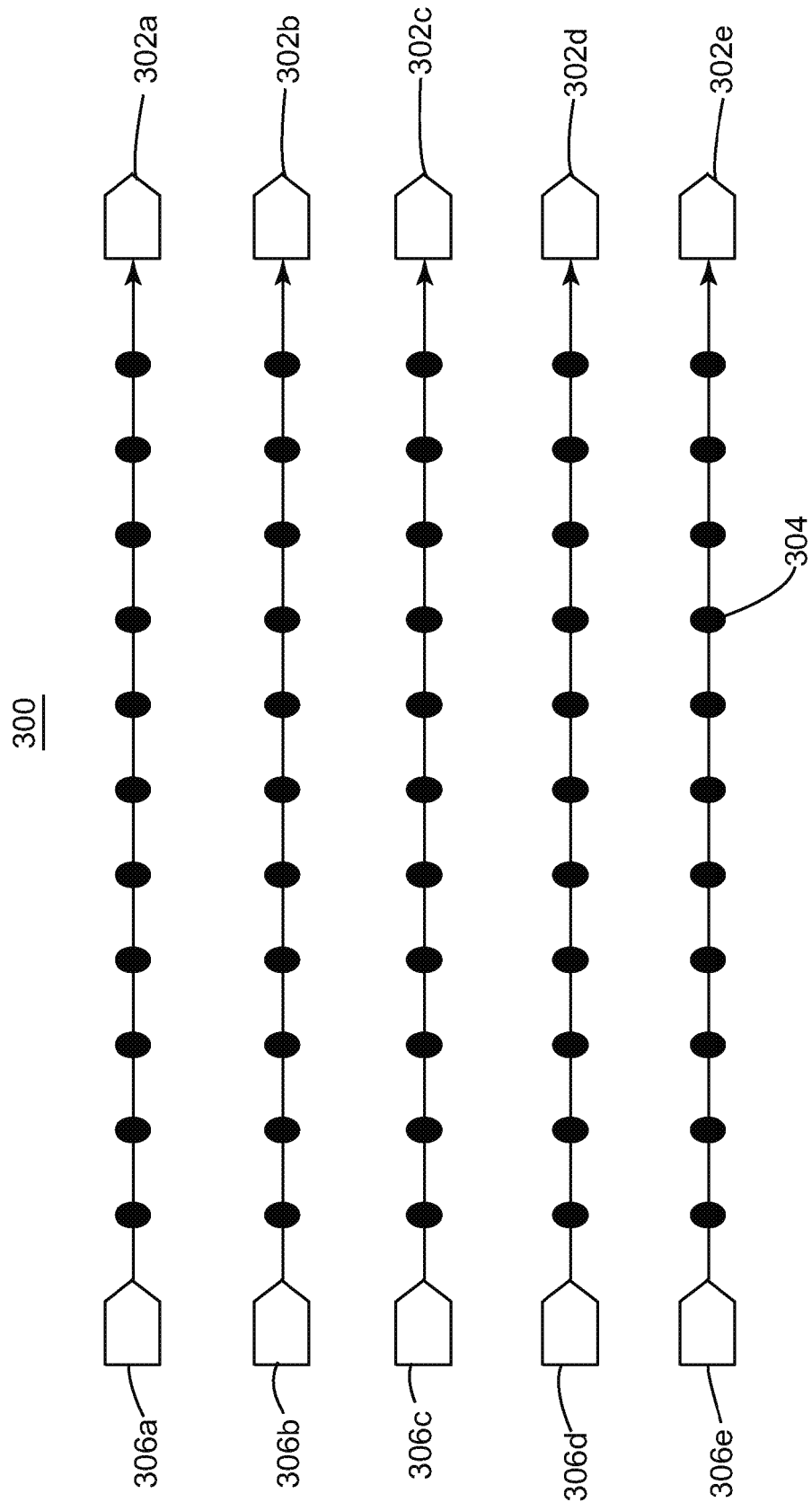
FIG. 8 is a schematic diagram of a 3D system for collecting seismic signals according to an exemplary embodiment.

The buoys may also be used to perform a 3D seismic survey as shown in FIG. 8. The system 300 may include plural launching vessels 302a-e and corresponding plural recovery vessels 306a-e. Buoys 304 are launched by each launching vessel and recovered by the corresponding recovery vessel as explained in the previous embodiments. Source vessels may be used to obtain a wide azimuth seismic survey. Thus, such a system may work similarly to a conventional system in which a vessel tows multiple streamers. In this case, a "streamer" is formed by the buoys between the launching vessel and the recovery vessel.

However, the system shown in FIG. 8 is cheaper than the conventional streamer system because the vessels used to launch and recover the buoys are not as sophisticated as the vessel that tows the streamers, and the buoys themselves are cheaper than the streamers. In addition, the present system obtains more diversified data, the seismic receivers reach a larger depth than the current depths achieved by the streamers, and the flow noise is minimized or entirely suppressed because the speed of the buoy during descent and ascent is controlled.

In addition, because the flow noise present in the case of the real streamers is absent in the present design, the speed of the launching and recovery vessels may be increased above the conventional 5 knots per hour speed used in streamer-based seismic surveys. This decreases the time necessary for completing the survey, which results in reduced cost for renting and operating the equipment, and also reduces personnel expenses. Further, the present system may be deployed near obstructed areas, e.g., next to drilling platforms, etc. Not the least, the data recorded with the present system achieves the highest notch diversity, which is desirable for data deghosting.

The systems and processes discussed above are just some examples for illustrating the novel concepts of using buoys for seismic data recording. Those skilled in the art would appreciate that these systems and/or processes may be changed, adjusted or modified to fit various needs. For example, the buoys may be replaced with similar devices that use no propelling means for reaching a desired depth.

In this regard, it is noted that it is known in the field to use autonomous underwater vehicles (AUV) for deploying seismic sensors. However, an AUV is different from a buoy in the sense that the buoy does not have a propulsion system, i.e., motor and associated propeller or water pump. Another difference between existing AUVs and the present buoys is that AUVs travel to the seabed and back without recording seismic data. Conventional AUVs land on the seabed and make some seismic recordings while stationary, after which they return to the surface.

One or more of the exemplary embodiments discussed above disclose a buoy configured to perform seismic recordings. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A buoy for recording seismic signals while underwater, the buoy comprising:
    a body;
    a buoyancy system configured to control a buoyancy of the body to descend multiple times to at least one predetermined depth (H) and then resurface with a controlled speed;
    a seismic sensor located on the body and configured to record the seismic signals;
    a processor configured to instruct the seismic sensor to record the seismic signals at a predetermined time interval;
    an inertial device configured to determine a relative displacement of the buoy between consecutive recordings;
    a timing device configured to provide an accurate time such that the recorded seismic signals are associated with a corresponding time and a corresponding relative displacement; and
    a global positioning system configured to determine initial and final water surface absolute locations of the buoy, wherein the initial water surface absolute location of the buoy is measured by the global positioning system prior to descending to the at least one predetermined depth (H), and the final water surface absolute location is measured by the global positioning system after the buoy resurfaces,
    wherein the processor is configured to calculate absolute positions for each time when the seismic signals are recorded, based on the relative displacement from the inertial device, the accurate time from the timing device and the initial and final water surface absolute locations of the buoy, and
    wherein the seismic sensor is instructed to record the seismic signals as the buoy travels up and down between the water surface and the predetermined depth.

2. The buoy of claim 1,
    wherein the processor is connected to the seismic sensor and the buoyancy system.

3. The buoy of claim 2, wherein the processor is further configured to instruct the buoyancy system to achieve one or more speeds while descending and/or ascending.

4. The buoy of claim 1,
    wherein the inertial device receives the initial and final water surface absolute locations of the buoy from the global positioning device.

5. The buoy of claim 1, further comprising:
    a temperature sensor configured to measure a temperature inside the bouy,
    wherein the timing device is configured to receive the temperature and correct its oscillating to provide an accurate time.

6. The buoy of claim 5, wherein the timing device is a temperature-controlled crystal oscillator.

7. The buoy of claim 1,
    wherein the global positioning system is configured to determine a water surface absolute location of the buoy when activated by the processor.

8. The buoy of claim 1, wherein the processor is configured to calculate the absolute positions for each time when the seismic signals are recorded, based on input from the inertial device and the timing device.

9. The buoy of claim 8, wherein the processor is configured to correct the absolute positions associated with the recorded data based on the water surface absolute location for the buoy by comparing (i) a resurfacing position of the buoy calculated by the inertial device, and (ii) an actual resurfacing position of the buoy determined by the global positioning system.

10. The buoy of claim 1, further comprising:
    a beacon configured to emit a radio-frequency signal when surfacing.

11. A system for conducting a marine seismic survey, the system comprising:
    plural buoys configured to record seismic signals when launched in water;
    a launching vessel configured to hold and launch the plural buoys along a given path;
    a recovery vessel configured to recover the plural buoys after the buoys have recorded the seismic signals at plural depths and times,
    wherein at least one buoy includes,
    a body,
    a buoyancy system configured to control a buoyancy of the body to descend multiple times to a predetermined depth (H) and then resurface with a controlled speed,
    a seismic sensor located in the body and configured to record the seismic signals,
    a processor configured to instruct the seismic sensor to record the seismic signals at a predetermined time interval,
    an inertial device configured to determine a relative displacement of the buoy between consecutive recordings,
    a timing device configured to provide an accurate time such that the recorded seismic signals are associated with a corresponding time and a corresponding relative displacement, and a global positioning system configured to determine initial and final water surface absolute locations of the buoy, wherein the initial water surface absolute location of the buoy is measured by the global positioning system prior to descending to the at least one predetermined depth (H), and the final water surface absolute location is measured by the global positioning system after the buoy resurfaces, wherein the processor is configured to calculate absolute positions for each time when the seismic signals are recorded, based on the relative displacement from the inertial device, the accurate time from the timing device and the initial and final water surface absolute locations of the buoy, and wherein the seismic sensor is instructed to record the seismic signals as the buoy travels up and down between the water surface and the predetermined depth.

12. The system of claim 11, wherein the processor is connected to the seismic sensor and the buoyancy system.

13. The system of claim 12, wherein the processor is further configured to instruct the buoyancy system to achieve one or more speeds while descending and/or ascending.

14. The system of claim 11, wherein another buoy comprises:
another inertial device configured to determine a relative displacement of the another buoy between a current position at which the seismic signals are recorded and a previous position at which the seismic signals were recorded,
another timing device configured to provide an accurate time such that recorded seismic signals are associated with a corresponding time and a corresponding relative displacement, and
another global positioning system configured to determine a water surface absolute location of the another buoy.

15. The buoy of claim 11,
wherein the processor is configured to correct the absolute positions of the recorded data based on the water surface absolute location of the buoy by comparing (i) a resurfacing position of the buoy calculated by the inertial device, and (ii) an actual resurfacing position of the buoy determined by the global positioning system.

16. The system of claim 11, further comprising:
at least one source vessel.

17. A method for recording seismic signals with buoys, the method comprising:
instructing at least one buoy to move up and down between a predetermined depth and the water surface;
recording the seismic signals with the at least one buoy at various depths between the predetermined depth and the water surface during a single trip;
time-stamping the seismic signals;
recording relative displacements, based on an input from an inertial system, of the at least one buoy between consecutive recordings;
determining initial and final water surface absolute locations of the buoy, wherein the initial water surface absolute location of the buoy is measured by a global positioning system prior to descending to the at least one predetermined depth, and the final water surface absolute location is measured by the global positioning system after the buoy resurfaces; and
calculating absolute positions for each time when the seismic signals are recorded based on the relative displacements, the time-stamping, and the initial and final water surface absolute locations of the buoy.

18. The method of claim 17, further comprising:
correcting the absolute positions based on input from the global positioning system when a difference between (i) a resurfacing position of the buoy calculated by the inertial device, and (ii) an actual resurfacing position of the buoy determined by the global positioning system is larger than a given threshold.

19. The method of claim 17, further comprising:
controlling a speed of the buoy in the water to minimize flow noise.

20. A computer readable medium including computer executable instructions, wherein the instructions, when executed by a processor, implement a method for recording seismic signals with buoys, the method comprising:
instructing at least one buoy to move up and down between a predetermined depth and the water surface;
recording the seismic signals with the at least one buoy at various depths between the predetermined depth and a water depth close to the water surface during a single trip;
time-stamping the seismic signals;
recording relative displacements, based on input from an inertial system, of the at least one buoy between consecutive recordings;
determining initial and final water surface absolute locations of the buoy, wherein the initial water surface absolute location of the buoy is measured by a global positioning system prior to descending to the at least one predetermined depth, and the final water surface absolute location is measured by the global positioning system after the buoy resurfaces; and
calculating absolute positions for each time when the seismic signals are recorded based on the relative displacements, the time-stamping, and the initial and final water surface absolute locations of the buoy.

* * * * *